Dec. 8, 1931.  J. B. HUDSON  1,835,944
SUGAR CANE JUICE STRAINER
Filed March 6, 1931
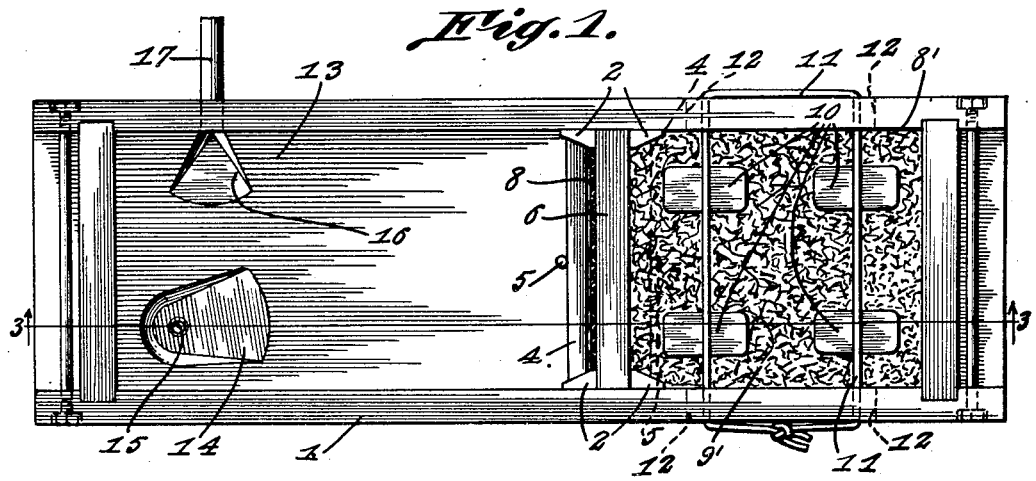
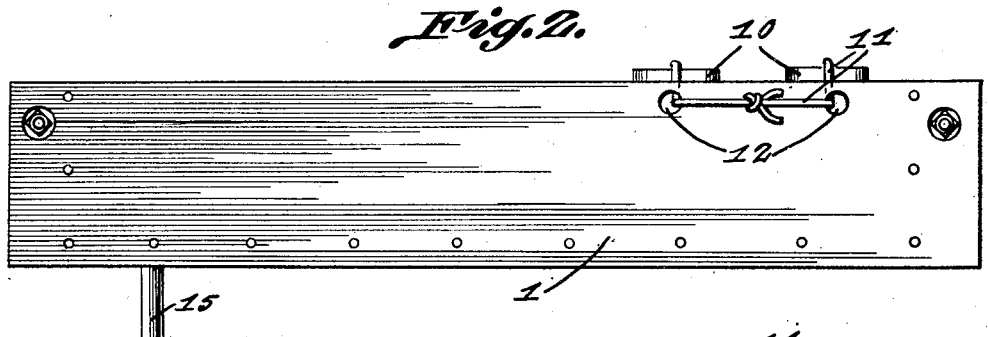
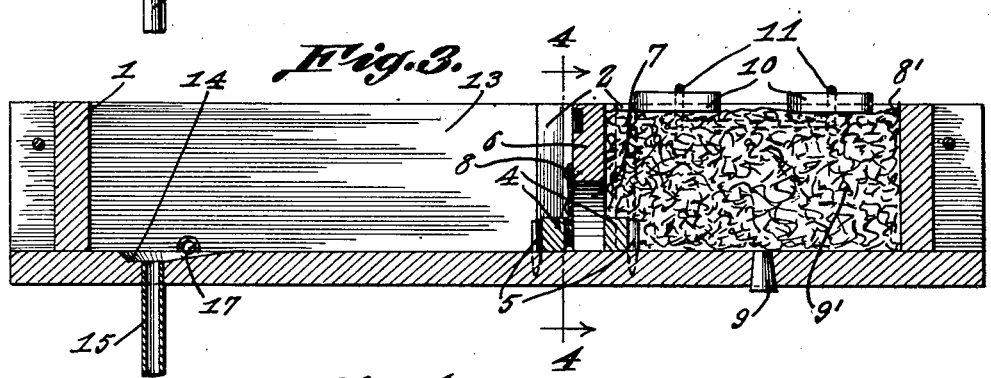
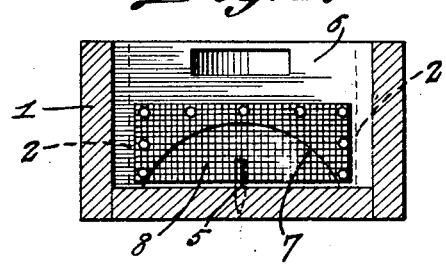
J. B. Hudson, INVENTOR
BY Victor J. Evans & Co.
ATTORNEYS Patented Dec. 8, 1931

1,835,944

UNITED STATES PATENT OFFICE

JOHN B. HUDSON, OF CHENEYVILLE, LOUISIANA

SUGAR CANE JUICE STRAINER

Application filed March 6, 1931. Serial No. 520,740.

My present invention has reference to a device for straining and cleaning cane juice prior to the making of sugar cane syrup in which the juice is directed through a filtering medium that comprises Spanish moss, forced by pressure through the moss and from thence directed through a screen on a division board to a compartment from whence it is delivered by a pipe to the cook pan or evaporator or through another pipe to a juice box.

To the attainment of the foregoing the intion consists in the improvement hereinafter described and definitely claimed.

In the drawings:

Figure 1 is a top plan view of the improvement.

Figure 2 is a side elevation thereof.

Figure 3 is a longitudinal sectional view on the line 3—3 of Figure 1.

Figure 4 is a transverse sectional view approximately on the line 4—4 of Figure 3.

As disclosed by the drawings my improvement contemplates the provision of a substantially rectangular box 1 which is preferably constructed of wood. The ends of the box are received in grooves in the sides and bottom thereof, and nailed thereto, while rods engaged by nuts pass through the sides outward of the ends for effectively sustaining the strainer in proper shape. The inner sides of the box-like body of the improvement, at a suitable distance from what I will term the rear end thereof, has attached thereto alining pairs of vertical strips or cleats 2, while comparatively thick strips 4 are arranged along the bottom of the box between the opposed pairs of cleats and may be held positioned by dowel pins 5. By reference to the drawings it will be seen that the outer faces of the cleats are beveled and that the ends of the strips 4 are likewise beveled so that the dowel pins 5 will effectively hold the strips against the cleats. The opposed pairs of cleats provide guideways for a division board 6. The board, from its lower edge, is provided with an arcuate opening 7 which is closed by a strip of fine wire mesh 8 that is tacked or otherwise secured to the face of the division board.

The division board has one or both of its sides, adjacent to its upper edge notched to afford a finger or hand grip and the division board is of a height equalling that of the box-like body 1. The division board 6 and the rear wall of the box 1 provide the said box with a filtering compartment 8'. The bottom wall of the compartment is provided with an opening that is normally closed by a plug 9 and this plug is only removed when the filtering compartment is to be cleaned by forcing water thereinto.

The filtering medium in the compartment 8 is in the nature of Spanish moss 9', the layers of the moss being properly arranged one over the other and on the top surface of the moss I place weights 10. The weights have their outer faces flared or bent and the weights are engaged by a strong cord or like flexible element 11 that passes through spaced pairs of openings 12 in the sides of the box-like body 1. The ends of the cord 11 are knotted and the cord is drawn taut to compress the weights against the filtering medium 9 and thereby compress the said filtering medium in the chamber 8 at desired intervals, such intervals being regulated by the flow of the cane juice through the filtering medium. Dirt or other undesirable substances will be prevented from flowing through the opening 7 and the mesh 8 in the division board by the cleats 4, the cleats being thus in the nature of trash catchers.

The juice that flows over the outer cleat, which is arranged in the juice receiving chamber 13, will travel into a depression 14 in the bottom wall of the said compartment 13 and through an opening to which is connected a pipe 15 that is directed to a cook pan or evaporator. The pipe 15 is arranged near the outer end wall of the compartment 13, and the side and end walls provided by the depression are preferably flared or arranged at an inward inclination. The compartment 13 has one of its side walls provided with another depression 16 that communicates with an opening in one of the side walls of the compartment 13, the said opening receiving therein a pipe 17 when the strained juice is to be delivered to a juice box, in which event the opening in which the pipe 15 is received may be plugged and in a like manner when all of the juice is to be delivered through the pipe 15 to the evaporator the opening in which the pipe 17 is arranged may be plugged.

My improvement is of an extremely simple nature, but by the employment thereof I have found from actual practice that the cane juice may be strained in a better and in a quicker manner than with any other construction with which I am acquainted. The strainer saves both labor and fuel and because of the employment of the Spanish moss as a filtering medium the syrup is given a different and more delicious flavor than a cane syrup produced by other filtering mediums.

It is thought the foregoing description will fully and clearly set forth the construction of my improvement to those skilled in the art to which my invention relates and the advantages thereof, but obviously I do not wish to be restricted to the precise details herein set forth and, therefore, hold myself entitled to make such changes therefrom as fairly fall within the scope of what I claim.

I do not wish to be restricted to any specific type of material employed in the construction of my improvement as the same may be of wood, metal or any other desired substance or material.

Having described the invention, I claim:

1. A filtering device for cane syrup comprising a box-like body member having spaced pairs of cleats fixed to the sides thereof, strips on the bottom of the body member in a line with the spaced pairs of cleats, a division board divided between the cleats dividing the body into a filtering compartment and into a juice receiving compartment, said filtering compartment having its lower edge provided with an arcuate slot and a closely woven mesh strip secured to the board and covering the slot, a filtering medium comprising packed Spanish moss in the filtering compartment, weights resting on the moss, adjustable means contacting the weights for moving the same to compress the moss and the lower wall of the juice compartment having depressions and pipes communicating with said depressions.

2. A filtering device for cane syrup comprising a box-like body member having spaced pairs of cleats fixed to the sides thereof, strips on the bottom of the body member in a line with the spaced pairs of cleats, a division board guided between the cleats dividing the body into a filtering compartment and into a juice receiving compartment, said filtering compartment having its lower edge provided with an arcuate slot and a closely woven mesh strip secured to the board and covering the slot, a filtering medium comprising packing Spanish moss into the filtering compartment, weights resting on the moss, a cord passed through openings in the sides of the filtering chamber contacting with the upper faces of the weights and designed to have its ends knotted at intervals to force the weights against the moss to compress the moss, adjustable means contacting the weights for moving the same to compress the moss and the lower wall of the juice compartment having depressions and pipes communicating with said depressions.

In testimony whereof I affix my signature.

JOHN B. HUDSON.